United States Patent
Batra et al.

(10) Patent No.: US 7,724,145 B2
(45) Date of Patent: May 25, 2010

(54) SELF-CHARGING RFID TAG WITH LONG LIFE

(75) Inventors: Naresh Batra, Saratoga, CA (US); Robert Olah, Sunnyvale, CA (US)

(73) Assignee: Intelleflex Corporation, San Jose, CA (US)

( * ) Notice: Subject to any disclaimer, the term of this patent is extended or adjusted under 35 U.S.C. 154(b) by 583 days.

(21) Appl. No.: 11/458,941

(22) Filed: Jul. 20, 2006

(65) Prior Publication Data

US 2008/0018466 A1    Jan. 24, 2008

(51) Int. Cl.
G08B 13/14    (2006.01)

(52) U.S. Cl. .................................. 340/572.8; 235/375

(58) Field of Classification Search ... 340/572.1–572.9; 235/375–385
See application file for complete search history.

(56) References Cited

U.S. PATENT DOCUMENTS

| | | | | |
|---|---|---|---|---|
| 4,449,114 A | 5/1984 | Fascenda et al. | ............ | 340/988 |
| 4,740,792 A | 4/1988 | Sagey et al. | ................. | 342/457 |
| 4,808,917 A | * 2/1989 | Fernandes et al. | ........... | 324/127 |
| 4,809,917 A | * 3/1989 | Tsuchiya | ................ | 242/439.5 |
| 5,300,875 A | 4/1994 | Tuttle | .......................... | 320/20 |
| 5,451,758 A | 9/1995 | Jesadanot | ................... | 235/384 |
| 5,572,226 A | 11/1996 | Tuttle | ......................... | 343/726 |
| 5,635,693 A | 6/1997 | Benson et al. | .............. | 235/384 |
| 5,644,207 A | 7/1997 | Lew et al. | ..................... | 320/5 |
| 5,719,586 A | 2/1998 | Tuttle | ......................... | 343/726 |
| 5,936,527 A | 8/1999 | Isaacman et al. | ........ | 340/572.1 |
| 6,052,065 A | 4/2000 | Glover | .................. | 340/825.54 |
| 6,052,068 A | 4/2000 | Price R-W et al. | ......... | 340/933 |
| 6,078,791 A | * 6/2000 | Tuttle et al. | ................ | 455/90.1 |
| 6,085,805 A | 7/2000 | Bates | .......................... | 141/94 |
| 6,109,525 A | 8/2000 | Blomqvist et al. | .......... | 235/384 |
| 6,400,274 B1 | 6/2002 | Duan et al. | .............. | 340/572.7 |
| 6,426,707 B1 | 7/2002 | Prieto et al. | ............. | 340/932.2 |
| 6,441,725 B1 | 8/2002 | Helm et al. | .............. | 340/425.5 |
| 6,587,755 B1 | 7/2003 | Smith et al. | .................... | 701/1 |
| 6,641,038 B2 | 11/2003 | Gehlot et al. | ............... | 235/384 |
| 6,748,797 B2 | 6/2004 | Breed et al. | ................... | 73/146 |
| 6,758,405 B2 | 7/2004 | Look | ......................... | 235/494 |
| 6,876,296 B2 | 4/2005 | Talmadge et al. | ........ | 340/10.42 |
| 6,882,274 B2 | 4/2005 | Richardson et al. | .... | 340/539.13 |
| 6,888,502 B2 | 5/2005 | Beigel et al. | ................ | 343/700 |
| 6,894,624 B2 | 5/2005 | Kim et al. | ................... | 340/933 |
| 6,943,678 B2 | 9/2005 | Muirhead | ................... | 340/505 |
| 6,944,424 B2 | 9/2005 | Heinrich et al. | ............ | 455/41.1 |

(Continued)

FOREIGN PATENT DOCUMENTS

EP    1160734 A2    5/2001

OTHER PUBLICATIONS

International Search Report and Written Opinion from PCT Application No. PCT/US07/14467 mailed on Jun. 26, 2008.

(Continued)

*Primary Examiner*—Davetta W Goins
*Assistant Examiner*—Edny Labbees
(74) *Attorney, Agent, or Firm*—Zilka-Kotab, pc

(57) ABSTRACT

A Radio Frequency Identification (RFID) device according to one embodiment of the present invention includes a rechargeable solid state battery, control circuitry coupled to the rechargeable solid state battery, and a power source for recharging the rechargeable solid state battery.

49 Claims, 7 Drawing Sheets

U.S. PATENT DOCUMENTS

| | | | |
|---|---|---|---|
| 7,286,929 B2 * | 10/2007 | Staton et al. | 701/206 |
| 7,301,462 B1 | 11/2007 | Holling et al. | 340/572.8 |
| 2002/0036569 A1 * | 3/2002 | Martin | 340/573.1 |
| 2002/0101332 A1 | 8/2002 | Talmadge et al. | 340/10.42 |
| 2002/0195490 A1 | 12/2002 | Gehlot et al. | 235/384 |
| 2003/0043042 A1 * | 3/2003 | Moores et al. | 340/573.1 |
| 2003/0112242 A1 | 6/2003 | Vitale et al. | 345/440 |
| 2003/0169207 A1 | 9/2003 | Beigel | 343/718 |
| 2003/0197613 A1 | 10/2003 | Hernandez et al. | 340/572.8 |
| 2004/0036595 A1 | 2/2004 | Kenny et al. | 340/505 |
| 2004/0073440 A1 | 4/2004 | Garbers et al. | 705/1 |
| 2004/0088228 A1 | 5/2004 | Mercer et al. | 705/28 |
| 2004/0104814 A1 | 6/2004 | Christensen et al. | 34/426.16 |
| 2004/0227002 A1 | 11/2004 | Watanabe | 235/491 |
| 2004/0257202 A1 | 12/2004 | Couglin et al. | 340/5.82 |
| 2004/0263316 A1 | 12/2004 | Dix et al. | 340/5.23 |
| 2005/0007251 A1 * | 1/2005 | Crabtree et al. | 340/539.13 |
| 2005/0052287 A1 | 3/2005 | Whitesmith et al. | 340/825.72 |
| 2005/0134462 A1 | 6/2005 | Shelley | 340/572.8 |
| 2005/0143883 A1 | 6/2005 | Yamagiwa | 701/32 |
| 2005/0145187 A1 | 7/2005 | Gray | 119/174 |
| 2005/0200457 A1 | 9/2005 | Bridgelall et al. | 340/10.3 |
| 2005/0237223 A1 | 10/2005 | Nishiwaki | 340/928 |
| 2005/0261563 A1 * | 11/2005 | Zhou et al. | 600/347 |
| 2006/0001827 A1 | 1/2006 | Howell et al. | 351/41 |

OTHER PUBLICATIONS

U.S. Appl. No. 11/423,407, filed Jun. 9, 2006.
U.S. Appl. No. 11/007,973, filed Dec. 8, 2004.
U.S. Appl. No. 11/423,408, filed Jun. 9, 2006.
Final Office Action Summary from U.S. Appl. No. 11/423,408 mailed on Mar. 5, 2009.
International Preliminary Examination Report from PCT Application No. PCT/US07/14467 mailed on Oct. 17, 2008.

* cited by examiner

SELF-CHARGING RFID TAG WITH LONG LIFE

FIELD OF THE INVENTION

The present invention relates to Radio Frequency Identification (RFID) systems and methods, and more particularly, this invention relates to RFID tags with a rechargeable battery.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects.

Addition of battery power to RFID tags has greatly increased the range in which reliable communication with the tag is possible. This has in turn made new applications possible. One such application is use of RFID tags in an automatic toll payment system. In such a system, an RFID tag having a unique ID that is associated with a vehicle is mounted to the vehicle windshield. When the vehicle passes through a toll lane, the tag identifier is read, correlated with an account, and payment if debited from the account. Thus, the need for a human toll collector is eliminated, as is the need to stop the vehicle at a toll booth. Further, such automated toll lanes are often dedicated to those vehicles having the RFID tag, thereby minimizing toll-collection-related delays.

One drawback of such systems is that the battery does not have an infinite life. Rather, once the battery is dead, the tag must typically be discarded or battery replaced. One solution is to connect the tag to the electrical system of the automobile. However, not only does the automobile need to be retrofitted to provide the power line to the tag, but the tag is then permanently mounted to the vehicle, meaning that if the owner decides to drive another car on the toll road or bridge, the driver must wait in line to pay at a toll booth rather than pass through the automated toll lane.

Another prominent use of battery powered RFID tags is asset tracking during shipment through a supply chain. However, as mentioned above, the life of the battery is not infinite, and so the tag will likely not remain active for the entire life of the object to which coupled. The tag may still respond to queries in a passive mode if it has built in multi-protocols and has C1G2 capability, where the tag is powered by the incoming RF signal, but the range for such communication is severely limited and may not be suitable for applications involving fast moving items such as automobiles, or in situations where an RFID interrogator is not readily available within range of the tag.

The use of liquid electrolyte rechargeable batteries in RFID tags has been contemplated. However, such rechargeable batteries typically provide less power per charge than a comparable disposable battery, and so need to be recharged rather frequently. Unfortunately, such rechargeable batteries do not have a large number of charge/recharge cycles. Rather, such rechargeable batteries lose capacity each time they are recharged, and therefore may only be recharged a handful of times before completely losing the ability to carry a charge sufficient for tag operations.

What are therefore needed are RFID systems and methods for uses such as, but not limited to, asset tracking, ownership transfer tracking and toll collection, which have a greatly improved life span and which overcome the deficiencies in heretofore known systems.

SUMMARY OF THE INVENTION

A Radio Frequency Identification (RFID) device according to one embodiment of the present invention includes a rechargeable solid state battery, control circuitry coupled to the rechargeable solid state battery, and a power source for recharging the rechargeable solid state battery. A primary battery may or may not be present.

In one embodiment, the power source captures energy from radio frequency waves. A first regulator and a second regulator may be coupled to the power source, the first regulator regulating a voltage on a line coupled to the rechargeable battery, the second regulator regulating a voltage on a line coupled to a control circuitry of the device. The first and second regulators may be present on a single chip. Preferably, the second regulator more tightly controls an output voltage thereof than the first regulator.

A supplemental power source may also or alternatively be present for recharging the rechargeable solid state battery. Illustrative supplemental power sources generate electricity from light, thermal energy, kinetic energy, etc. Where two power sources are present, a first regulator may regulate a voltage from the first power source, while the supplemental power source primarily charges the rechargeable solid state battery when a voltage from the supplemental power source is greater than a voltage from the power source. Preferably, the output of the first power source is substantially isolated from the supplemental power source.

A power manager may be present for controlling recharging and consumption of the rechargeable solid state battery.

In a preferred embodiment, the rechargeable solid state battery may be recharged more than about 100,000 times. The rechargeable solid state battery may have less than about a 1% capacity loss per year. The rechargeable solid state battery may be capable of maintaining at least about a 50% charge for 10 years.

A ratio of a cross sectional area of the rechargeable solid state battery in a direction parallel to the plane to a cross sectional area of the device in the direction parallel to the plane may be between about 1:4 and 1:1.

A Radio Frequency Identification (RFID) tag for use with a vehicle according to one embodiment includes a housing adapted for permanent or detachable coupling to the vehicle, control circuitry coupled to the housing, and a solid state battery for providing power to the control circuitry. A supplemental power source is also present for recharging the battery. A memory stores information relating to at least one of the vehicle and an owner of the vehicle. The capability of recharging the battery greatly extends the active (self-powered) life of the tag.

The housing may be adapted for permanent or detachable coupling to a window of the vehicle, such as the windshield or back window. Coupling to other locations on the vehicle such as on the exterior surface thereof, on the dashboard, etc. is also possible.

Again, the supplemental power source may be any type of supplemental power source. Preferred supplemental power sources generate electricity from light, thermal energy, and/or kinetic energy.

Preferably, the control circuitry draws power from the supplemental power source when the supplemental power source is generating electricity. This also helps conserve battery power, as well as allows the tag to operate when the battery is diminished. The control circuitry may remain in an active state when drawing power from the supplemental power source, as opposed to reverting to a battery-conserving hibernate state.

The memory can store information such as a vehicle identification number, a license plate number associated with the vehicle, a name of the owner of the vehicle, and a government-issued registration number associated with the vehicle. The memory may also store information relating to an insurance policy associated with the vehicle. The memory may also store information relating to a service history of the vehicle. The memory may also store information relating to a toll payment account associated with the at least one of the vehicle and the owner Access to portions of the information stored in the memory may be selectively allowed or denied based on information received from an inquiring entity. Such information can include a security code, identification of the entity or type of entity, etc.

Preferably, the tag is permanently coupled to the vehicle by a manufacturer of the vehicle, thereby allowing tracking of the vehicle throughout its life. However, the tag may be affixed later. For example, the tag may be coupled to the vehicle by a dealer of the vehicle.

The tag may further include a display device for displaying at least a portion of the information relating to the at least one of the vehicle and the owner.

A method for tracking ownership of a moveable object according to one embodiment includes coupling an RFID tag to the object. The RFID tag includes control circuitry, a rechargeable solid state battery for providing power to the control circuitry, a supplemental power source for recharging the battery, and a memory for storing information relating to the object. Information about at least one of an owner of the object, a location of the object, and a sensor reading may be added to the memory in anticipation of or in response to moving the object from one location to another location. For example, information about a new owner is added to the memory upon transferring ownership of the object to the new owner. Illustrative objects which may be tracked include a vehicle or other article of manufacture, a transportation container, an animal, etc. The tag may be coupled to the object at about a point of manufacture of the object.

A method for retrieving information about a vehicle according to one embodiment includes transmitting a query to an RFID tag coupled to the vehicle, the query containing a security code. Information relating to the vehicle or the owner is received. The particular information received or decodable depends on the security code.

An article of manufacture according to one embodiment includes an object, and an RFID tag coupled to the object.

An RFID system includes a plurality of RFID tags and an RFID reader in communication with the RFID tags. Each tag may be coupled to an object, each tag storing information about the object to which coupled. Likewise, each tag may have a unique identifier, the identifier being correlated with information about the object in a database.

Other aspects and advantages of the present invention will become apparent from the following detailed description, which, when taken in conjunction with the drawings, illustrate by way of example, the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direction contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
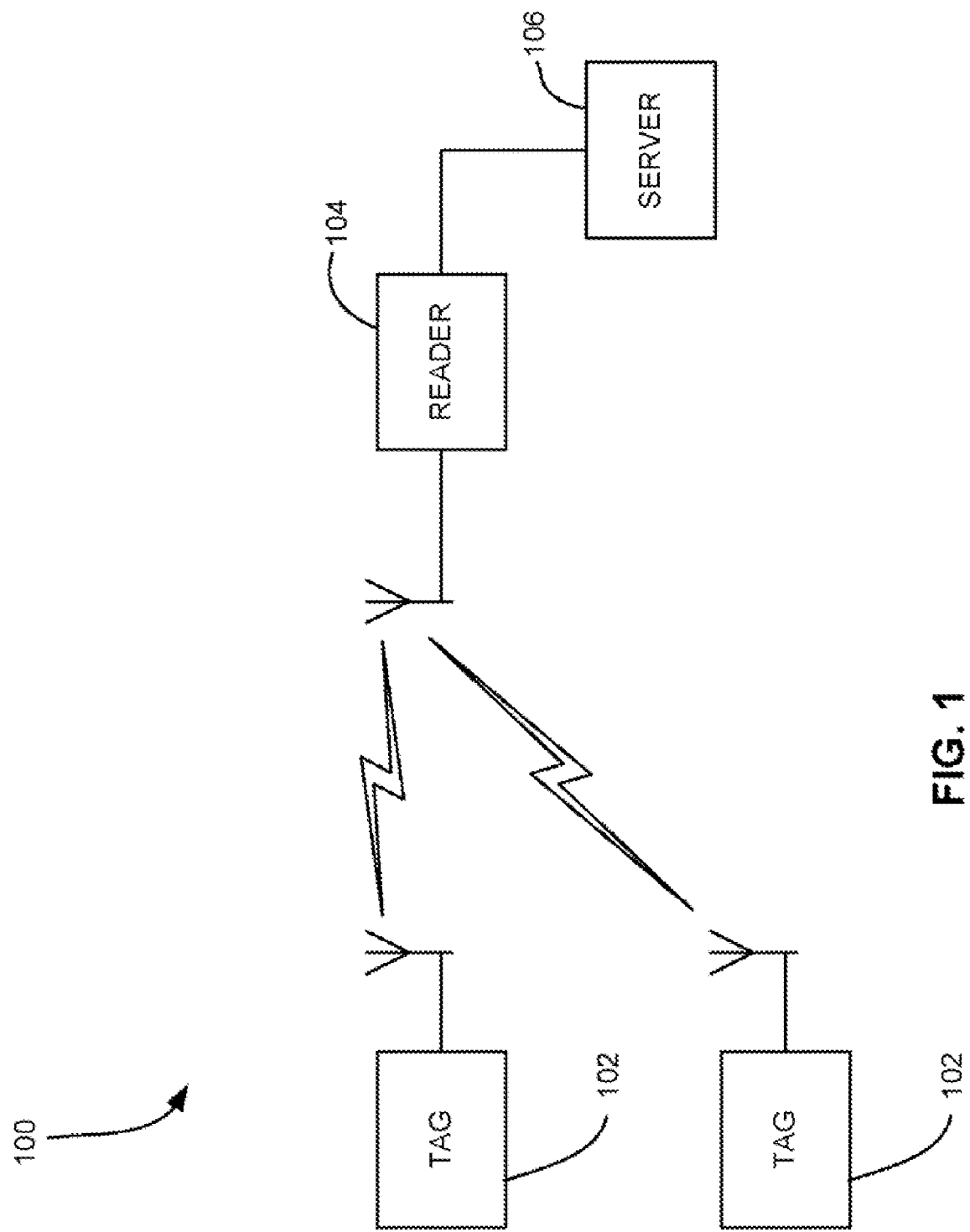
FIG. 1 is a system diagram of an RFID system.

As shown in FIG. 1, an RFID system 100 typically includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the reader 104. The chip may also include a power supply circuit to extract and regulate power from the RF reader, a detector to decode signals from the reader; a backscatter modulator, a transmitter to send data back to the reader; anti-collision protocol circuits; and at least enough memory to store its unique identification code, e.g. Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN, UCC System Keys, UId, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with a reader 104 sending out signals via radio wave to find a tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds. One illustrative application of ultra high-frequency tags is automated toll collection on highways and interstates.

Figure 2:
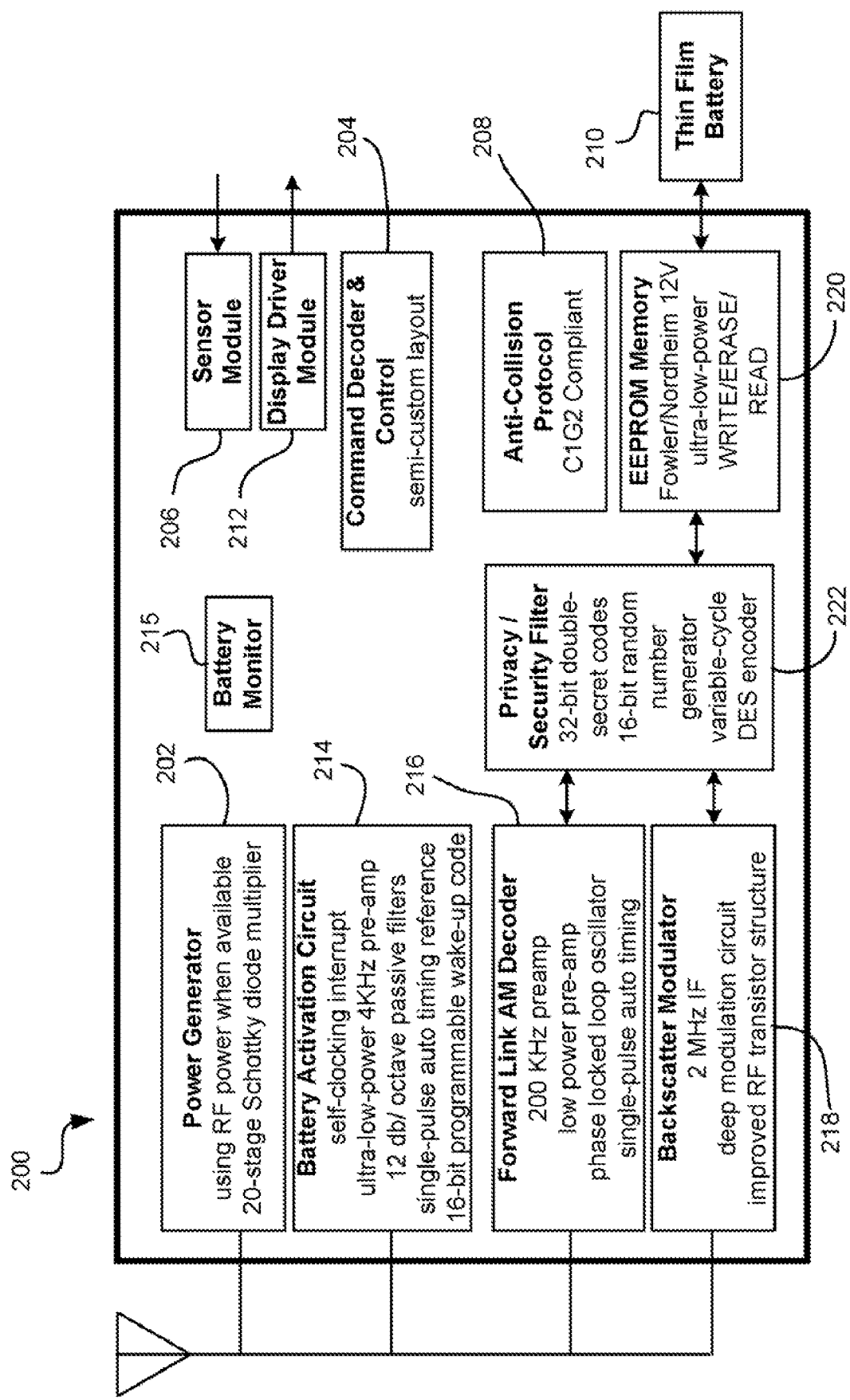
FIG. 2 is a system diagram for an integrated circuit (IC) chip for implementation in an RFID tag.

Embodiments of the present invention are preferably implemented in a Class-3 or higher Class chip, which typically contains the control circuitry for most if not all tag operations. FIG. 2 depicts a circuit layout of a Class-3 chip 200 and the various control circuitry according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may means a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the reader can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 battery 210. While any type of battery activation circuit known in the art can be potentially integrated into the system, an illustrative battery activation circuit 214 is described in copending U.S. patent application Ser. No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with readers, etc. can be used.

Only six connection pads (not shown) are required for the illustrative chip 200 of FIG. 2 to function: Vdd to the battery, ground, plus two antenna leads to support multi-element omni-directional and isotropic antennas. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use of a computer, including optical media such as read only and writeable CD and DVD, magnetic memory, semiconductor memory (e.g. FLASH memory and other portable memory cards, etc.), etc. Further, such software can be downloadable or otherwise transferable from one computing device to another via network, wireless link, nonvolatile memory device, etc.

Figure 3:
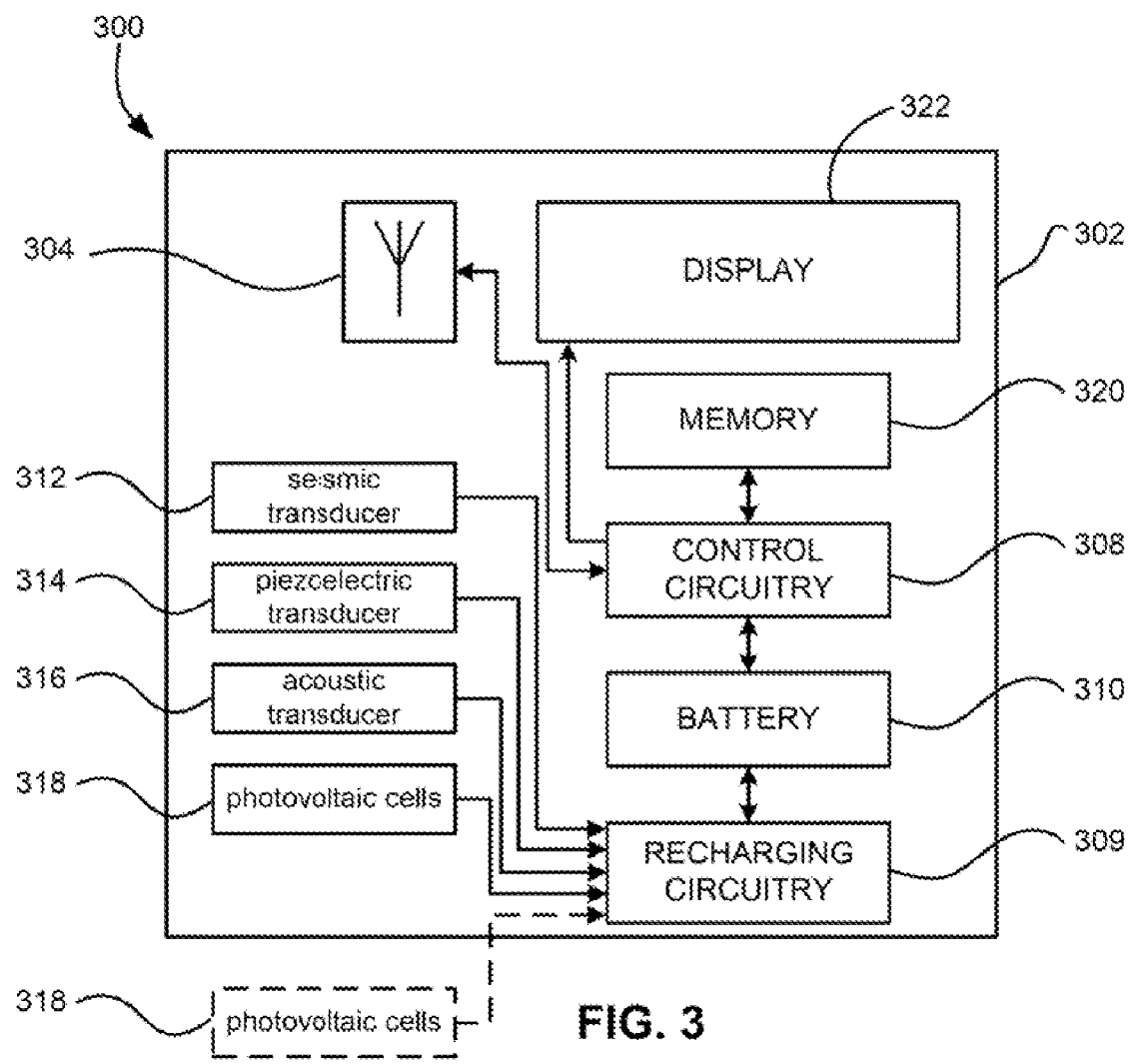
FIG. 3 is a system diagram of an RFID tag according to one embodiment of the present invention.

FIG. 3 illustrates a Radio Frequency Identification (RFID) device 300 according to one embodiment of the present invention, here in the form of an RFID tag. As shown in FIG. 3, the tag 300 includes one or more antennae 304, control circuitry 200 coupled to a housing 302, recharging circuitry 309, a primary battery 210 for providing power to the control circuitry 200, and a rechargeable battery 310 for providing power to the control circuitry 200. The control circuitry 200 may be embodied in a chip, such as part of the chip shown in FIG. 2.

An RF energy capture circuit, such as the power generation circuit 202 of FIG. 2, generates power from incoming RF waves. This acts as a power source for recharging the rechargeable battery 310 and/or powering various components of the tag.

A supplemental power source may also be coupled to the rechargeable battery 310 and/or other components of the tag. Note that while the following description refers to a "supplemental" power source, the supplemental power source may indeed be the sole device that captures energy from outside the tag, be it from solar, RF, kinetic, etc. energy.

As shown in the embodiment of FIG. 3, one or more supplemental power sources 312-318 may be present (or present instead of the RF energy capture circuit) for recharging the rechargeable battery 310 and/or powering the control circuitry 200. The supplemental power source(s) may be any type of supplemental power source. Preferred supplemental power sources generate electricity from light (e.g. solar power), thermal energy, and/or kinetic energy. As shown in FIG. 3, illustrative supplemental power sources include a seismic transducer 312, piezoelectric transducer 314, acoustic transducer 316 and photovoltaic cells 318, each of which may also contain passive and/or low-power active circuits such as transformers, resistors and capacitors to condition the transducer outputs to match the input requirements of the recharging circuitry.

As FIG. 3 shows, seismic transducer 312, piezoelectric transducer 314, acoustic transducer 316 and/or photovoltaic cells 318 are used to either receive energy from a generating source or transmit energy, and couple that energy to recharging circuitry 309. All of the transducers, (312, 314, 316, 318) are capable of generating and transmitting their own energy which will prove advantageous to the various embodiments in which implemented. Any one of the above mentioned devices or any combination thereof may be used to present energy in the form of an alternating current (A.C.) or direct current (D.C.) voltage to recharging circuitry 309. Recharging circuitry 309 then processes the energy received and provides it to the rechargeable battery 310 (or batteries, but referred to hereinafter as battery for examples purposes) 310 as a trickle charging source. The capability of recharging the rechargeable battery 310 greatly extends the active (self-powered) life of the tag.

In one embodiment, the control circuitry 200 draws power from a supplemental power source when the supplemental power source is generating electricity. This also helps conserve battery power, as well as allows the tag to operate when the primary battery 210 and/or the rechargeable battery 310 is diminished. The control circuitry may remain in an active state when drawing power from the supplemental power source, as opposed to reverting to a battery-conserving hibernate state.

Referring again to FIG. 3, each voltage source receiver must receive its power from a power generating source or generate its own. Referring now to seismic transducer 312, a seismic geophone (such as a magnet-on-spring bouncing inside a coil) may be used to create a power source that is received by seismic transducer 312. Transducer 312 then in turn generates a voltage that is presented to recharging circuitry 309 and the process continues as described above. The seismic geophone used could also be a separate unit located in close proximity to the RFID tag 300.

Referring now to piezoelectric transducer 314, energy is received from a source such as a seismic piezoelectric accelerometer. Transducer 314 then in turn generates a voltage that is presented to recharging circuitry 309 and the process continues as described above. The seismic piezoelectric accelerometer may be directly attached to the RFID tag 300 or in a separate unit located in communicable proximity to the RFID tag 300.

Referring now to acoustic transducer 316, acoustic energy (e.g., ultrasonic waves) is received by transducer 316. Though an acoustic transducer is preferred for receiving acoustic energy, and is en electromagnetic form of an ultrasonic transducer, other ultrasonic transducers that may be used include piezoelectric, electrostatic, and magnetostrictive devices. In fact, any of these ultrasonic transducers may be used to generate an ultrasonic wave that would be detected by transducer 316. Transducer 316 then in turn generates a voltage that is presented to recharging circuitry 309 and the process continues as described above.

Referring now to photovoltaic cells 318, these cells are preferably mounted on the exterior of the RFID tag 300 (as indicated by the dashed lined box 318), or they could be infrared cells fabricated on the inside of the RFID tag 300 that are driven by heat dissipated by the package. An infrared source for heating the package would then be required. Cells 318 then in turn generate a voltage that is presented to recharging circuitry 309 and the process continues as described above.

In a preferred embodiment, the supplemental power source is positioned on one side of the tag, while the rechargeable battery is positioned on the other side of the tag. This allows the supplemental power source to be exposed if desired, e.g., as would be required for a solar cell to gather light energy. In such case, a window (closed or open) may be provided to expose the supplemental power source to its surroundings. Placing the rechargeable battery along the back of the tag behind the antenna also minimizes any RF interference.

Figure 4:
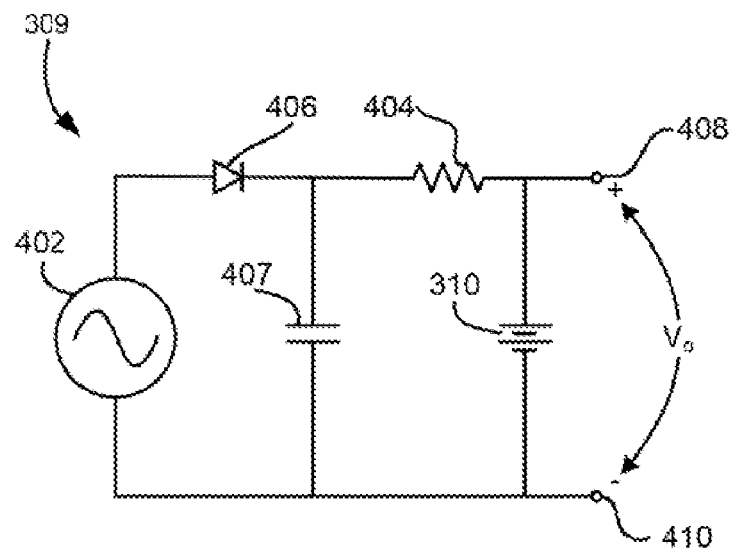
FIG. 4 is a circuit diagram of recharging circuitry.

FIG. 4 depicts suitable recharging circuitry 309 that may be used for receiving an A.C. voltage source 402 (again, from at least one of the supplemental power sources 304, 312, 314, 316 and 318) wherein the A.C. current developed is rectified by diode 406 and regulated by the capacitor 407. The voltage id developed across terminals 408 and 410 of the rechargeable battery 310. The recharging current is limited by the resistor 404 for trickle charging.

Figure 5:
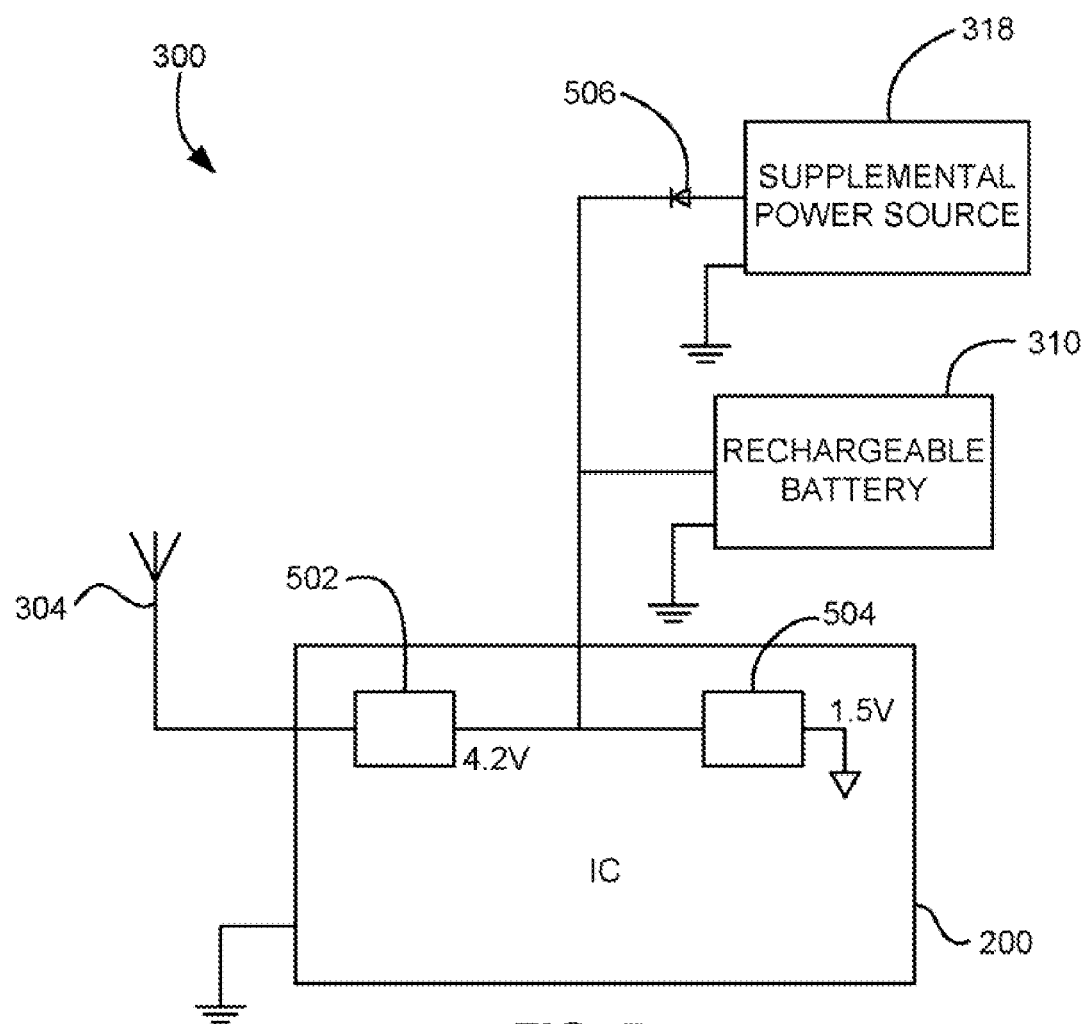
FIG. 5 is a circuit diagram of recharging circuitry.

FIG. 5 depicts a preferred embodiment which utilizes two voltage sources, a primary power source, e.g., antenna 304 and a supplemental power source, e.g., photovoltaic cell 318. The voltage output from the primary power source is regulated by a first regulator 502 down to a predetermined voltage, e.g., 4.2 V, which is directed to the rechargeable battery 310 for recharging the rechargeable battery 310. A second regulator 504 outputs a second predetermined voltage, e.g., 1.5 V, for use by the control circuitry 200. In one embodiment, the second regulator 504 more tightly controls its output voltage than the first regulator 502, as the power level supplied to the control circuitry 200 is typically more critical than the power level supplied to the rechargeable battery 310.

Note that a single regulator circuit capable of producing both voltages can be implemented instead of two individual regulators.

In one embodiment which includes a primary power source, e.g., an RF energy capture circuit, and a supplemental power source, if the voltage produced by the supplemental power source is greater than the voltage output from the first regulator 502, the supplemental power source primarily charges the rechargeable battery 310. If the voltage produced by the supplemental power source is less than the voltage from the first regulator 502, the energy from the first regulator 502 is used to recharge the rechargeable battery.

Similarly, if the voltage of the rechargeable battery is less than the voltage generated by the RF energy, the excess current is directed to the battery. Typically, a reader takes a few seconds when it wants to program the EEProm of the tag. This may be enough time to fully charge the rechargeable battery.

As an option, an electrical valve 506 such as a diode or equivalent feature may be present to reduce or prevent power from the first regulator 502 from being passed to the supplemental power source. In other words, the electrical valve 506 substantially or completely isolates the supplemental power source from the RF capture circuit. This in turn not only protects the supplemental power source 318, but also ensures that the energy from the first regulator 502 is primarily directed to the rechargeable battery 310 instead of being drawn down by the supplemental power source. Also, assuming the valve 506 is a diode, if the voltage from the supplemental power source is more than one diode drop above the battery voltage, the current flows from the supplemental power source into the rechargeable battery, thus replenishing its energy.

The supplemental power source can also power the control circuitry and other portions of the device. As shown in FIG. 5, the second regulator 504 can receive energy from the supplemental power source and/or rechargeable battery 310 even when no RF energy is present.

Use of the rechargeable battery 310 to power the tag is very beneficial in applications where the tag must power up to perform some function, such as take a sensor reading. Another benefit is that, in tags where some process is continuously running, as in an activate circuit, the circuitry running the process may be able to run mainly or fully on power supplied by the rechargeable battery 310. Further, the supplemental power source may keep the rechargeable battery 310 fully charged.

Regarding physical connections between the various components on the tag, any known electrical connections can be implemented. Where the rechargeable battery 310 is in the form of a thin film, the terminal thereof can be coupled directly to the chip, or coupled thereto via additional leads and/or circuitry.

As an option, a power manager (hardware or software) can be present to further control where energy is directed. For example, if a weak RF signal is coming in, the processor can direct all RF energy to the tag. If no RF signal is coming in but the supplemental power source is providing energy, the regulator may direct all energy from the supplemental power source for use by the tag. If a reading needs to be taken, the power manager can direct power from the rechargeable battery 310 to the chip, rather than from the primary battery.

The power manager can also moderate energy consumption by the various components of the tag, e.g., by sending some of the energy to the second regulator and some of the energy to the rechargeable battery 310. The power manager in another embodiment is capable of controlling the regulator(s) output voltage level(s). Moreover, the power manager can dynamically adjust power levels and/or energy levels in read time.

The rechargeable battery 310 may be any type of rechargeable battery. In preferred embodiments, the rechargeable battery 310 is a thin film solid state battery, i.e., has no liquid electrolyte. Rechargeable solid state batteries have a longer life than electrolyte-based batteries, i.e., can be recharged many times more, do not lose capacity as quickly, and also are capable of storing a charge for much longer periods of time.

Preferred rechargeable solid state batteries have one or more of the following features. The battery may be constructed in the form of a thin, flexible sheet, which can be less than 200 μm thick, and can be formed in almost any shape desired. The battery may be recharged more than 100,000 times, and ideally more than 200,000 times, with a less than 1% capacity loss per year and minimal or no memory effect, thereby allowing the battery to outlive most applications for which the tag might be used. The battery may have a very wide operating temperature range. One illustrative battery has an operating temperature of between about −40° C. to about 150° C. or higher. The battery preferably has a peak power of greater than about 50 mA. A solid state battery in one embodiment is capable of recharging in less than 2 minutes at a recharge voltage of 4.2 V. The charge stored on the battery may be maintained for many years, e.g., greater than 50% charge retention after 10 years. The solid state battery does not outgas or leak hazardous substances. The solid state battery may be molded or embedded into the device itself. The solid state battery may survive additional fabrication steps during assembly of the device.

The solid state battery may be added to the tag during construction of the tag as a layer thereof. A solid state battery may extend about to the edges of the tag, or may have a lesser expanse. A typical ratio of cross-sectional areas between the solid state battery and the tag along their planes is between about 1:4 and about 1:1.

In a preferred embodiment, the supplemental power source is positioned on one side of the tag, while the rechargeable battery is positioned on the other side of the tag. This allows the supplemental power source to be exposed if desired, e.g., as would be required for a solar cell to gather light energy. In such case, a window (closed or open) may be provided to expose the supplemental power source to its surroundings. Placing the rechargeable battery along the back of the tag behind the antenna also minimizes any RF interference.

As mentioned above, RFID devices described herein may be used in a plethora of industries and applications, including automotive applications, asset tracking including articles of manufacture and livestock, yard management, security and access control, etc. Several illustrative embodiments are provided below.

Figure 6:
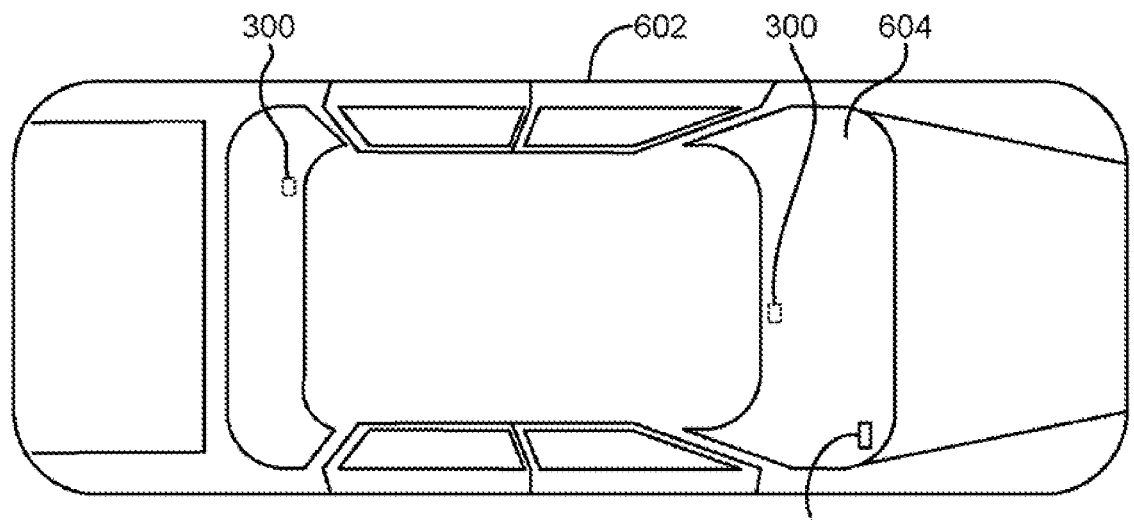
FIG. 6 illustrates the tag of FIG. 3 in use with a vehicle.

FIG. 6 illustrates multiple tags 300 in use with a vehicle 602. The tag 300 includes a housing 302 adapted for permanent or detachable coupling to the vehicle 602. Permanent coupling to the vehicle 302 can be achieved via adhesives, threaded fasteners, rivets, etc. The housing may be adapted for permanent or detachable coupling to a window of the vehicle, such as the windshield 604 (as shown) or back window. Coupling to other locations on the vehicle such as on the exterior surface thereof, on the dashboard, etc. is also possible. The tag 300 may also be integrated into the vehicle 602, e.g., integrated by injection molding into a portion of the vehicle such as the dashboard, rear view mirror, or other area that is capable of receiving RF transmissions relatively unimpeded.

Preferably, the tag is permanently coupled to the vehicle by a manufacturer of the vehicle, thereby allowing tracking of the vehicle throughout its life. However, the tag may be affixed later. For example, the tag may be coupled to the vehicle by a dealer of the vehicle, a repair shop, etc.

Memory on the tag 300 stores information relating to the vehicle 602 and/or an owner of the vehicle. For example, the memory 220 can store information such as a vehicle identification number (VIN), a license plate number associated with the vehicle, a name of the owner of the vehicle, a government-issued registration number associated with the vehicle, etc.

The memory 220 may also store information relating to an insurance policy associated with the vehicle. Such information may include the policy number, whether the policy is in force, expiration date of the policy, persons covered by the policy, etc.

The memory 220 may also store information relating to a service history of the vehicle. Such information can include a service record identification number, dates and types of service, locations of service, identification of the technician who performed the service, any problems encountered, etc.

The memory may also store information relating to a toll payment account associated with the vehicle and/or owner. Thus, embodiments of the tag may act as a toll pass with account information, payment information, etc.

Preferably, a security protocol is in place so that unauthorized readers cannot access the information stored on the tag. The security protocol may include a password-based secret handshake, for example. Accordingly, access to portions of the information stored in the memory may be selectively allowed or denied based on information received from the inquiring entity. Such information can include a security code, identification of the entity or type of entity, password for a secret handshake, etc. Further, the transmission is preferably encrypted using any suitable encryption scheme.

The tag 300 may further include a display device 322 for displaying at least a portion of the information relating to the vehicle and/or owner. For instance, the tag may display the VIN upon receiving a query from a police reader. In another example, the tag may display an amount of prepaid money remaining in the driver's toll account, an amount of tolls accumulated since the last payment, etc.

Because of the high number of recharge cycles available from the rechargeable solid state battery 310, it is unlikely that it would need to be replaced. This embodiment thus overcomes the drawbacks of rechargeable electrolyte-based batteries which, for instance, no long maintain an acceptable charge after several discharge/recharge cycles.

The information stored in the tag can be transferred into a new tag is the tag falters or fails for some reason. The information (or portion thereof) can be loaded by the then-owner, a dealer, a govt. entity, etc.

Similarly, information, such as registration and insurance information, can be uploaded to the tag via roadside readers, etc. A roadside reader can be attached to anything, including a road sign, bridge, overpass, etc. For example, as cards pass by an overhead reader, the reader queries the tag for its registration information. The reader compares the registration information to data stored in a local or remote database. If the registration information is expired, the reader can update the tag if the owner has renewed, or can register the violation with law enforcement. If the registration information shows signs of tampering, e.g., the tag indicates that the registration is current but the database indicates that it is expired, the system can send a notice to law enforcement. Because the tag is a long range tag, it can be read reliably even at highway speeds, e.g., 60 miles per hour.

In another example of use, during a routine traffic stop by police, a reader in the police car can scan the tag in the automobile and, using the retrieved information, perform a variety of functions. For example, information stored on the tag can be output to the officer. Such information can include registration and insurance information, registered owner, license plate number, etc. Further, the system may automatically query a database to retrieve additional information about the vehicle and/or its owner. For example, the VIN retrieved from the tag can be automatically compared to a list of VIN's associated with stolen vehicles or vehicles believed to be involved in a crime. Similarly, the name of the registered owner can compared to a list of persons having outstanding warrants. If the vehicle is listed as stolen or possible involved in a crime, or the registered owner has a warrant outstanding, the office can be warned and thus allowed to take precautions.

As alluded above, access to certain information can be selective based on the inquiring entity. For instance, only police may have access to the vehicles registration information stored on the tag. Only a toll reader may have access to the user's payment information stored on the tag. A repair shop may not have access to the registration information or toll payment information. But the police, toll and repair shop readers may all be granted access to the VIN for tracking purposes, for example.

The tag may also provide security functions. For example, the tag may be operatively coupled to the electrical system of the vehicle via hardwired or wireless connection. Removal of the tag causes disablement of the vehicle, e.g., the engine will not start. Likewise, a valid user tag (e.g., tag associated with an authorized user such as registered owner) may need to be present in order to start the vehicle. Illustrative RFID-based security systems and methods suitable for integration into embodiments of the present invention are found in U.S. patent application entitle "RFID-BASED SECURITY SYSTEMS AND METHODS" filed concurrently herewith to the same inventor and which is herein incorporated by reference.

Figure 7:
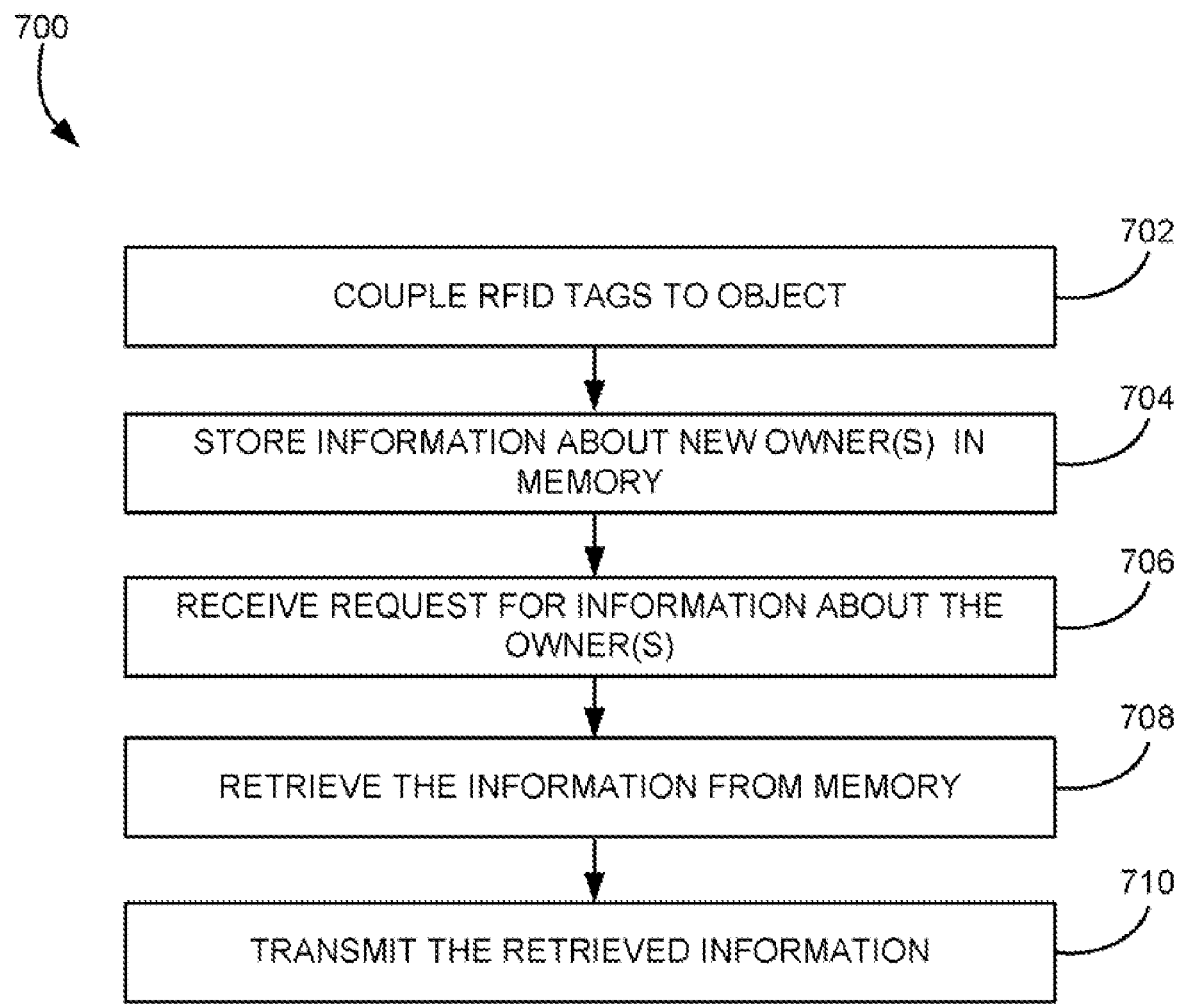
FIG. 7 is a process diagram of a method for tracking ownership of a moveable object according to one embodiment of the present invention.

FIG. 7 depicts a method 700 for tracking ownership of a moveable object according to one embodiment of the present invention. The method can be used with any type of asset or chattel that moves through a chain of commerce including vehicles, transportation containers, animals, e.g., cattle (ear tags, implants), train cars, golf carts, etc. that are tracked and subject to ownership transfer. In operation 702, RFID tags are coupled to the objects. Each tag has a rechargeable battery for providing power to control circuitry, a supplemental power source for recharging the battery, and a memory for storing information relating to previous and current owners of the object. In operation 704, information about a new owner may be added to the memory upon transferring ownership of the object to the new owner. Information about a location of the object and/or a sensor reading may be written to the memory in anticipation of or in response to moving the object from one location to another location. In operations 706-710, the information about the owner, location, and/or sensor reading is retrieved from memory and transmitted upon receiving a request for the information.

The tag may be coupled to the object at about a point of manufacture or origin of the object. For example, the tag may be placed on a vehicle windshield during or shortly after manufacturing. The tag can then be used to track the automobile in the manufacturer's lot. When the vehicle is sent from the manufacturer to the consumer, the tag stores to the ownership transfer to the delivery truck, stores the ownership transfer from the truck to the dealer, allows tracking the automobile in the dealer lot, and stores the ownership transfer from the dealer to the consumer.

Figure 8:
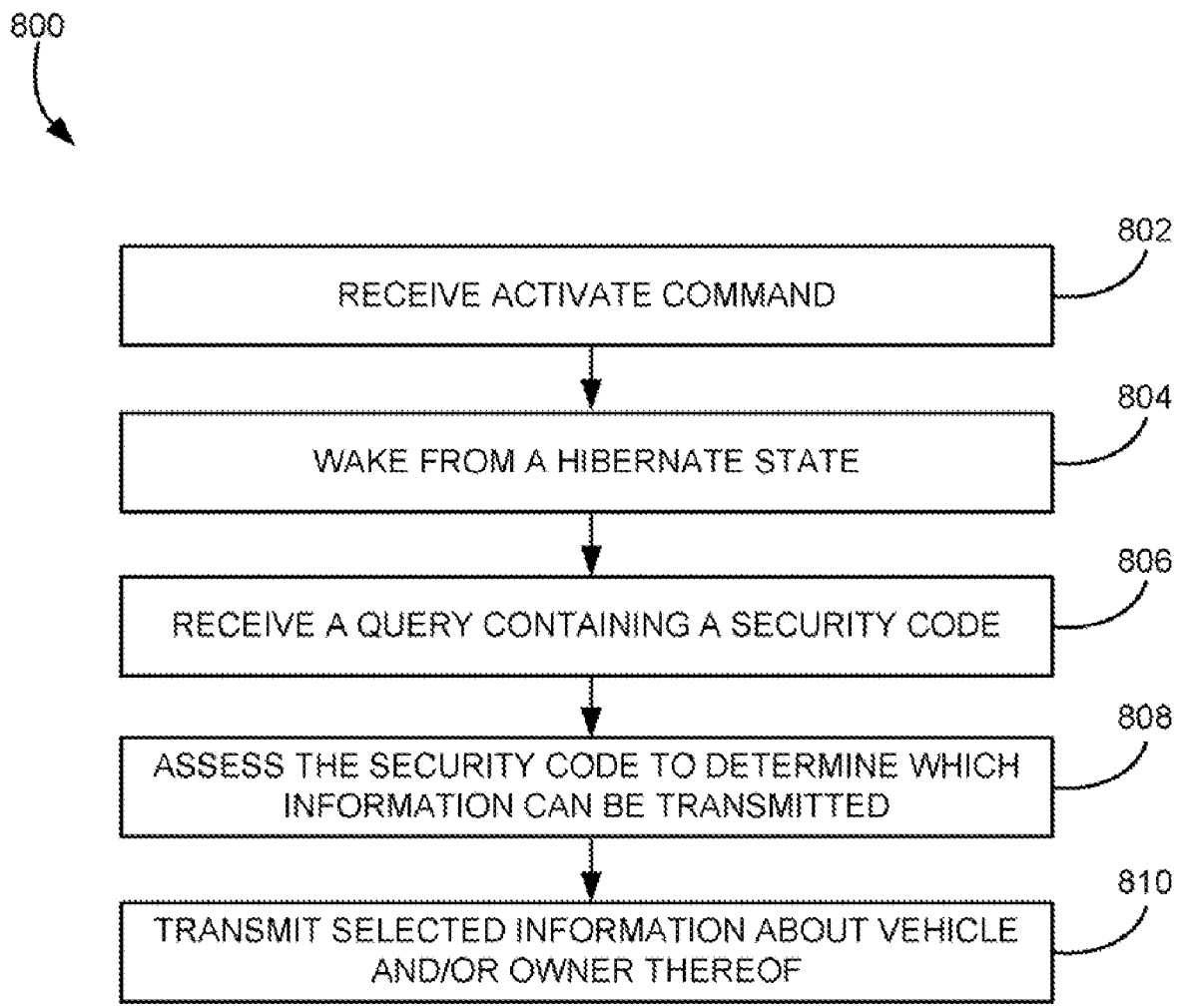
FIG. 8 is a process diagram of a method for transmitting information about a vehicle according to one embodiment of the present invention.

FIG. 8 depicts a method 800 for transmitting information about a vehicle according to one embodiment of the present invention. In operation 802, an activate command is received at an RFID tag coupled to the vehicle. In operation 804, the tag wakes from a hibernate state. In operation 806, a query is received, the query containing a security code. In operation 808, the security code is assessed to determine which information can be transmitted. In response to the query and based on the assessment, information relating to the vehicle or the owner is transmitted in operation 810. The particular information transmitted depends on the security code received.

Figure 9:
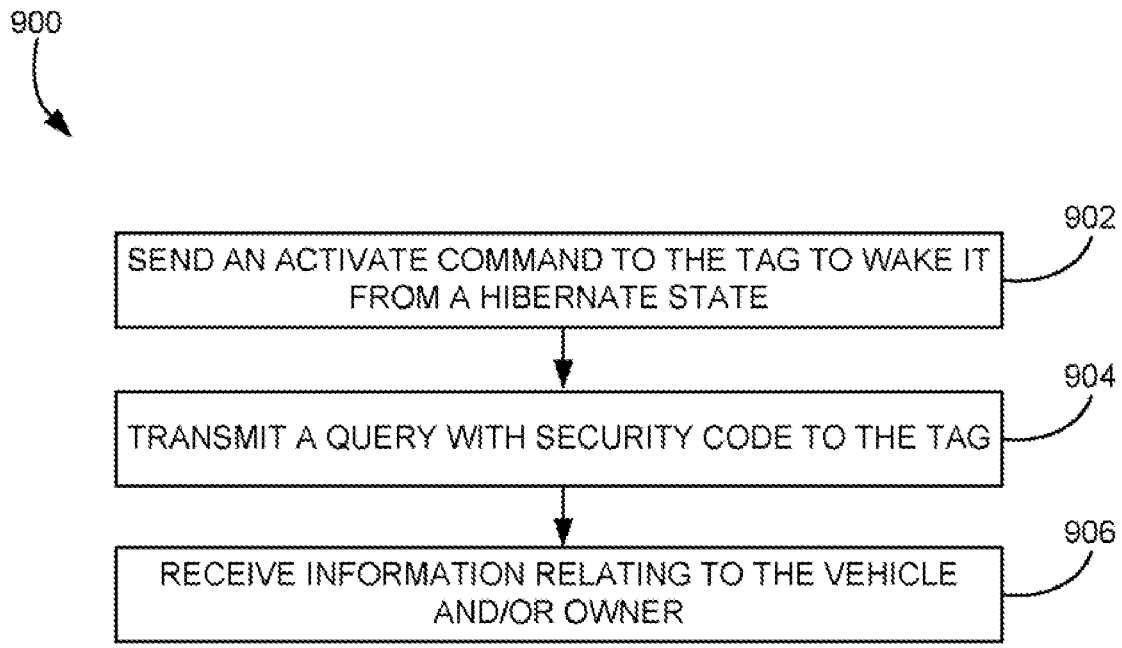
FIG. 9 is a process diagram of a method for retrieving information about a vehicle according to one embodiment of the present invention.

FIG. 9 depicts a method 900 for retrieving information about a vehicle according to one embodiment of the present invention. In operation 902, an activate command is sent to the tag to wake it from a hibernate state. In operation 904, a query is transmitted to an RFID tag coupled to the vehicle, the query containing a security code, e.g. password, pseudorandom number, etc. In operation 906, information relating to the vehicle and/or the owner is received. The particular information received or decodable depends on the security code sent to the tag.

Figure 10:
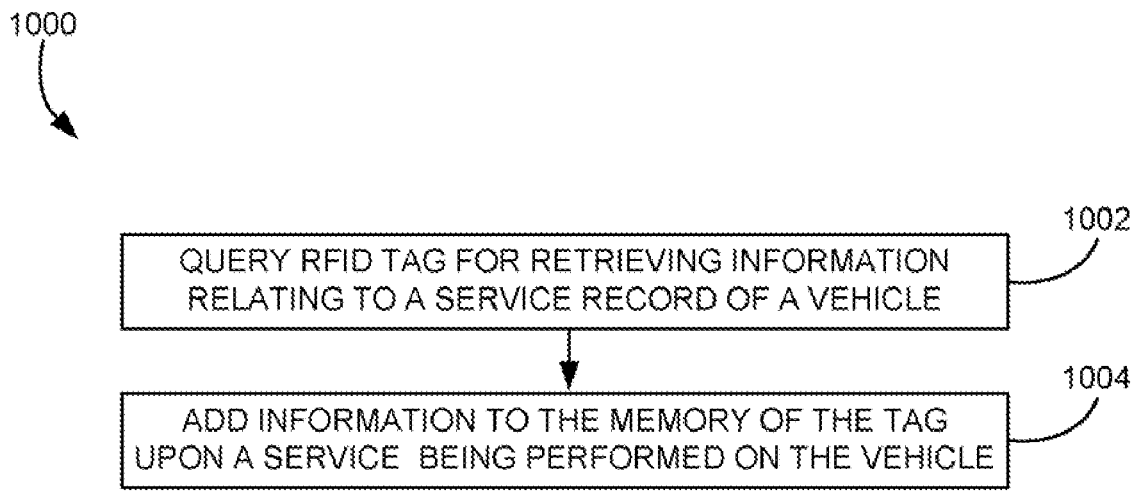
FIG. 10 is a process diagram of a method for storing information relating to a service record of a vehicle using an RFID tag coupled to a vehicle according to one embodiment of the present invention.

FIG. 10 depicts a method 1000 for storing information relating to a service record of a vehicle using an RFID tag coupled to a vehicle. In operation 1002, the RFID tag is queried for retrieving information relating to a service record of the vehicle. In operation 1004, information is added to the memory of the RFID tag upon a service being performed on the vehicle.

In a repair shop example, the moment a car pulls into the shop, the reader scans the tag and identifies the vehicle. The identification is used to extract data about the vehicle from a database. Such information may include vehicle and owner information, service history, payment history, etc.

The tag may also be tied to the onboard computer system of the automobile to enable such features as transmitting information about problems with the vehicle directly to the reader without requiring a hardwired connection.

In an illustrative security and access control scenario, assume employees of a company wear semi-passive RFID identification badges. Each badge includes a rechargeable battery and a solar cell-based supplemental power source. Solar cells may be located on the front, and optionally the front and back, of the badge. As the employee works and moves about the facility, the solar cell gathers energy from ambient light and keeps the rechargeable battery charged. During communication between the badge and a reader, energy stored in the rechargeable battery can be used to enable the communications.

In an illustrative construction scenario, assume components such as bricks or beams of a building each have a semi-passive RFID tag coupled thereto or embedded therein. Each tag has a unique ID, which is correlated to information about the component and stored in a database. Such information can include date of manufacture, composition, manufacturer, the date that the block was taken from the yard, lot number, etc. Such information can also be stored in memory on the tag in addition to in the database, or in the alternative. Also assume that each tag has a rechargeable solid state battery and, optionally, a supplemental power source. Years later, assume that concrete blocks in lot 1234 are found to be defective, and so any building containing blocks from that lot need to be replaced or other remedial action taken. Because the tags are semi-passive, an inspector can retrieve information from all of the tags from a moderate distance (e.g., >3 meters) and therefore is less likely to miss a tag, as would be likely if the tags were purely passive or if the on-board power source were depleted. Further, because the tags implement a solid state battery, the tag should have enough power to enable the semi-passive response.

One skilled in the art will appreciate how the systems and methods presented herein can be applied to a plethora of scenarios and venues, including but not limited to automotive yards, warehouses, construction yards, retail stores, boxcards and trailers, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) device, comprising:
   a rechargeable solid state battery;
   control circuitry coupled to the rechargeable solid state battery;
   a power source for recharging the rechargeable solid state battery; and
   a primary battery; and
   a first regulator and a second regulator coupled to the power source, the first regulator regulating a voltage on a line coupled to the rechargeable solid state battery, the second regulator regulating a voltage on a line coupled to a control circuitry,
   wherein the control circuitry is able to selectively draw power from the rechargeable solid state battery and not the primary battery,
   wherein if a voltage produced by the supplemental power source is greater than the voltage output from the first regulator, the supplemental power source primarily charges the rechargeable battery,
   wherein if the voltage produced by the supplemental power source is less than the voltage from the first regulator, energy from the first regulator is used to recharge the rechargeable battery.

2. A Radio Frequency Identification (RFID) device, comprising:
   a rechargeable solid state battery;
   control circuitry coupled to the rechargeable solid state battery;
   a power source for recharging the rechargeable solid state battery, wherein the power source captures energy from radio frequency waves; and
   a first regulator and a second regulator coupled to the power source, the first regulator regulating a voltage on a line coupled to the rechargeable battery, the second regulator regulating a voltage on a line coupled to a control circuitry of the device,
   wherein the line coupled to the rechargeable battery is also coupled to the second regulator,
   wherein the first and second regulators are present on a single chip, wherein excess current on the line coupled to the rechargeable solid state battery is directed to the rechargeable solid state battery if a voltage of the rechargeable solid state battery is less than the voltage on the line coupled thereto.

3. A device as recited in claim 2, wherein the second regulator more tightly controls an output voltage thereof than the first regulator.

4. A Radio Frequency Identification (RFID) device, comprising:
   a rechargeable solid state battery;
   control circuitry coupled to the rechargeable solid state battery; and
   a power source for recharging the rechargeable solid state battery wherein the power source captures energy from radio frequency waves; and
   a supplemental power source for recharging the rechargeable solid state battery,
   a first regulator and a second regulator coupled to the power source, the first regulator regulating a voltage on a line coupled to the rechargeable solid state battery, the second regulator regulating a voltage on a line coupled to a control circuitry,
   wherein if a voltage produced by the supplemental power source is greater than the voltage output from the first regulator, the supplemental power source primarily charges the rechargeable battery,
   wherein if the voltage produced by the supplemental power source is less than the voltage from the first regulator, energy from the first regulator is used to recharge the rechargeable battery,
   with the proviso that neither the power source nor the supplemental power source are batteries.

5. A device as recited in claim 2, further comprising a supplemental power source for recharging the rechargeable solid state battery.

6. A device as recited in claim 4, wherein the output of the power source is substantially electrically isolated from the supplemental power source, wherein the output of the power source and an output of the supplemental power source are coupled to the rechargeable solid state battery for charging the rechargeable solid state battery.

7. A device as recited in claim 2, wherein the control circuitry does not draw power from the primary battery when the power source is generating power.

8. A device as recited in claim 2, wherein the control circuitry does not draw power from the primary battery when the rechargeable solid state battery has sufficient energy to power the control circuitry.

9. A device as recited in claim 2, wherein the supplemental power source generates electricity from at least one of kinetic energy and thermal energy.

10. A device as recited in claim 2, further comprising a power manager for controlling recharging and consumption of the rechargeable solid state battery.

11. A device as recited in claim 2, wherein the power source generates electricity from light.

12. A device as recited in claim 2, wherein the power source generates electricity from at least one of thermal energy and kinetic energy.

13. A device as recited in claim 4, wherein the power source generates electricity from at least one of thermal energy and kinetic energy.

14. A device as recited in claim 2, wherein the rechargeable solid state battery may be recharged more than about 100,000 times.

15. A device as recited in claim 2, wherein the rechargeable solid state battery has less than about a 1% capacity loss per year.

16. A device as recited in claim 2, wherein the rechargeable solid state battery is capable of maintaining at least about a 50% charge for 10 years.

17. A device as recited in claim 2, wherein the rechargeable solid state battery lies substantially along a plane, wherein a ratio of a cross sectional area of the rechargeable solid state battery in a direction parallel to the plane to a cross sectional area of the device in the direction parallel to the plane is between about 1:4 and 1:1.

18. A device as recited in claim 2, wherein the rechargeable solid state battery lies substantially along a plane, wherein a ratio of a cross sectional area of the rechargeable solid state battery in a direction parallel to the plane to a cross sectional area of the device in the direction parallel to the plane is between about 1:2 and 1:1.

19. A Radio Frequency Identification (RFID) device, comprising:
a primary battery;
a rechargeable solid state battery;
control circuitry coupled to the primary battery and to the rechargeable solid state battery;
a power source for recharging the rechargeable solid state battery and for providing power to the control circuitry;
a supplemental power source for recharging the rechargeable solid state battery; and
a first regulator and a second regulator coupled to the power source, the first regulator regulating a voltage on a line coupled to the rechargeable solid state battery, the second regulator regulating a voltage on a line coupled to a control circuitry,
wherein if a voltage produced by the supplemental power source is greater than the voltage output from the first regulator, the supplemental power source primarily charges the rechargeable battery,
wherein if the voltage produced by the supplemental power source is less than the voltage from the first regulator, energy from the first regulator is used to recharge the rechargeable battery.

20. A Radio Frequency Identification (RFID) system, comprising:
a plurality of RFID devices as recited in claim 19; and
an RFID reader in communication with the RFID devices.

21. A Radio Frequency Identification (RFID) device for use with a vehicle, comprising:
a housing adapted for coupling to a vehicle;
control circuitry coupled to the housing;
a primary battery;
a rechargeable solid state battery;
control circuitry coupled to the rechargeable solid state battery;
a power source for recharging the rechargeable solid state battery;
a memory for storing information relating to at least one of the vehicle and an owner of the vehicle;
control circuitry coupled to the rechargeable solid state battery;
a power source for recharging the rechargeable solid state battery, wherein the power source captures energy from radio frequency waves; and
a first regulator and a second regulator coupled to the power source, the first regulator regulating a voltage on a line coupled to the rechargeable battery, the second regulator regulating a voltage on a line coupled to a control circuitry of the device,
wherein the control circuitry is able to selectively draw power from the rechargeable solid state battery and not the primary battery.

22. A device as recited in claim 21, wherein the housing is adapted for permanent coupling to the vehicle.

23. A device as recited in claim 22, wherein the housing is integrated into a portion of the vehicle.

24. A device as recited in claim 19, wherein the power source generates electricity from light.

25. A device as recited in claim 19, wherein the power source generates electricity from thermal energy.

26. A device as recited in claim 19, wherein the power source generates electricity from kinetic energy.

27. A device as recited in claim 19, wherein the control circuitry draws power from the power source when the power source is generating electricity.

28. A device as recited in claim 27, wherein the control circuitry remains in an active state when drawing power from the power source.

29. A device as recited in claim 2, further comprising a housing adapted for coupling to a vehicle; and a memory for storing information relating to at least one of the vehicle and an owner of the vehicle.

30. A device as recited in claim 29, wherein the memory stores a vehicle identification number, a license plate number associated with the vehicle, a name of the owner of the vehicle, and a government-issued registration number associated with the vehicle.

31. A device as recited in claim 29, wherein the memory stores information relating to an insurance policy associated with the vehicle.

32. A device as recited in claim 29, wherein the memory stores information relating to a service history of the vehicle.

33. A device as recited in claim 29, wherein access to portions of the information stored in the memory is selectively allowed or denied based on information received from an inquiring entity.

34. A device as recited in claim 29, wherein the memory stores information relating to a toll payment account associated with the at least one of the vehicle and the owner.

35. A device as recited in claim 29, wherein the device is permanently coupled to the vehicle by a manufacturer of the vehicle.

36. A device as recited in claim 29, wherein the device is permanently coupled to the vehicle by a dealer of the vehicle.

37. A device as recited in claim 29, further comprising a display device, the display device displaying at least a portion of the information relating to the at least one of the vehicle and the owner.

38. A Radio Frequency Identification (RFID) system, comprising:
a plurality of REID devices as recited in claim 29, and
an RFID reader in communication with the RFID devices.

39. A method for tracking ownership of a moveable object, the method comprising:
coupling a Radio Frequency Identification (RFID) tag to the object, the REID tag comprising:
control circuitry;
a primary battery for providing power to the control circuitry;
a rechargeable solid state battery for providing power to the control circuitry, wherein the control circuitry is able to selectively draw power from the rechargeable solid state battery and not the primary battery;
a power source for recharging the battery;
a memory for storing information relating to the object; and
a first regulator and a second regulator coupled to the power source, the first regulator regulating a voltage on a line coupled to the rechargeable solid state battery, the second regulator regulating a voltage on a line coupled to a control circuitry,
wherein if a voltage produced by the supplemental power source is greater than the voltage output from the first regulator, the supplemental power source primarily charges the rechargeable battery,
wherein if the voltage produced by the supplemental power source is less than the voltage from the first regulator, energy from the first regulator is used to recharge the rechargeable battery; and
adding information about at least one of an owner of the object, a location of the object, and a sensor reading to the memory in anticipation of or in response to moving the object from one location to another location.

40. A method as recited in claim 39, wherein the object is a vehicle.

41. A method as recited in claim 39, wherein the object is a transportation container.

42. A method as recited in claim 39, wherein the object is an animal.

43. A method as recited in claim 39, wherein the object is an article of manufacture.

44. A method as recited in claim 39, wherein the object is a container for articles of manufacture.

45. A method as recited in claim 39, wherein the tag is coupled to the object at about a point of manufacture of the object.

46. A method for retrieving information about a vehicle, the method comprising:
transmitting a query to a Radio Frequency Identification (RFID) tag coupled to the vehicle, the query containing a security code, the RFID tag comprising:
control circuitry;
a rechargeable solid state battery for providing power to the control circuitry;
a power source for recharging the battery;
a supplemental power source for recharging the battery; and
a memory for storing information relating to at least one of the vehicle and an owner of the vehicle,
a first regulator and a second regulator coupled to the power source, the first regulator regulating a voltage on a line coupled to the rechargeable solid state battery, the second regulator regulating a voltage on a line coupled to a control circuitry,
wherein if a voltage produced by the supplemental power source is greater than the voltage output from the first regulator, the supplemental power source primarily charges the rechargeable battery,
wherein if the voltage produced by the supplemental power source is less than the voltage from the first regulator, energy from the first regulator is used to recharge the rechargeable battery;
receiving information relating to the vehicle or the owner, the information received depending on the security code.

47. An article of manufacture, comprising:
a Radio Frequency Identification (RFID) tag, the RFID tag comprising:
control circuitry;
a primary battery for providing power to the control circuitry;
a rechargeable solid state battery for providing power to the control circuitry, wherein the control circuitry is able to selectively draw power from the rechargeable solid state battery and not the primary battery;
a power source for recharging the rechargeable solid state battery;
a supplemental power source for recharging the rechargeable solid state battery;
a first regulator and a second regulator coupled to the power source, the first regulator regulating a voltage on a line coupled to the rechargeable battery, the second regulator regulating a voltage on a line coupled to a control circuitry of the device; and
a memory,
wherein the control circuitry is able to selectively draw power from the rechargeable solid state battery and not the primary battery,
wherein the line coupled to the rechargeable battery is also coupled to the second regulator,
wherein if a voltage produced by the supplemental power source is greater than the voltage output from the first regulator, the supplemental power source primarily charges the rechargeable battery,
wherein if the voltage produced by the supplemental power source is less than the voltage from the first regulator, energy from the first regulator is used to recharge the rechargeable battery.

48. A device as recited in claim 2, with the proviso that the rechargeable solid state battery and the primary battery are not coupled in series.

49. A device as recited in claim 29, wherein the memory stores information selected from a group consisting of a vehicle identification number, a license plate number associated with the vehicle, a name of the owner of the vehicle, and a government-issued registration number associated with the vehicle.

* * * * *

UNITED STATES PATENT AND TRADEMARK OFFICE
CERTIFICATE OF CORRECTION

PATENT NO. : 7,724,145 B2
APPLICATION NO. : 11/458941
DATED : May 25, 2010
INVENTOR(S) : Naresh Batra et al.

It is certified that error appears in the above-identified patent and that said Letters Patent is hereby corrected as shown below:

In the specification:

col. 1, line 65 replace "if" with --is--;
col. 5, line 18 replace "direction" with --direct--;
col. 5, line 48 replace "UId" with --UID--;
col. 7, line 26 replace "means" with --mean--;
col. 8, line 34 replace "of" with --by--;
col. 9, line 23 replace "examples" with --example--;
col. 9, line 57 replace "en" with --an--;
col. 10, line 22 replace "id" with --is--;
col. 11, line 21 replace "terminal" with --terminals--;
col. 11, line 40 replace "read" with --real--;
col. 13, line 18 replace "long" with --longer--;
col. 13, line 21 replace "is" with --if--;
col. 13, line 27 replace "cards" with --cars--;
col. 15, line 45 replace "boxcards" with --boxcars--.

In the claims:

col. 19, line 15 replace "REID" with --RFID--;
col. 19, line 20 replace "REID" with --RFID--.

Signed and Sealed this

Tenth Day of August, 2010

David J. Kappos
*Director of the United States Patent and Trademark Office*